United States Patent
Rahimi

(10) Patent No.: US 7,877,339 B2
(45) Date of Patent: Jan. 25, 2011

(54) METHOD AND SYSTEM OF CREATING AN APPROXIMATE KERNEL MATRIX TO TRAIN A KERNEL MACHINE

(75) Inventor: Ali Rahimi, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 865 days.

(21) Appl. No.: 11/821,919

(22) Filed: Jun. 26, 2007

(65) Prior Publication Data

US 2009/0006287 A1   Jan. 1, 2009

(51) Int. Cl.
- G06E 15/18 (2006.01)
- G06F 7/76 (2006.01)
- G06F 17/10 (2006.01)
- G06F 17/16 (2006.01)
- G06N 3/08 (2006.01)
- G06G 7/122 (2006.01)

(52) U.S. Cl. .............................. 706/16; 706/17; 706/25; 706/26

(58) Field of Classification Search .................... 706/16
See application file for complete search history.

(56) References Cited

U.S. PATENT DOCUMENTS 6,944,602 B2 *   9/2005   Cristianini ................... 706/12

OTHER PUBLICATIONS

Cristianini in view of Drineas et al. (Drineas), Approximating a Gram Matrix for Improved Kernel-Based Learning (Extended Abstract), COLT 2005, LNAI 3559, pp. 323-337, 2005.*

Grauman et al. (Grauman), The Pyramid Match Kernel: Discriminative Classification with Sets of Image Features, Proceedings of the IEEE International Conference on Computer Vision, Beijing, China, Oct. 2005.*

* cited by examiner

Primary Examiner—Michael B. Holmes
Assistant Examiner—Nathan H Brown, Jr.
(74) Attorney, Agent, or Firm—Blakely, Sokoloff, Taylor & Zafman LLP

(57) ABSTRACT

A method and system of creating an approximate kernel matrix to train a kernel machine. In one embodiment of the invention, a set of kernel machine training data is partitioned into a set of partitioned training data based on a set of partition parameters. The set of partition parameters includes one or more of, an axis-aligned grid location, or an axis-aligned grid resolution in one embodiment of the invention. A partition matrix that approximates a kernel machine kernel matrix is created from the set of partitioned training data and the partition matrix is used to train a kernel machine in one embodiment of the invention.

13 Claims, 4 Drawing Sheets

METHOD AND SYSTEM OF CREATING AN APPROXIMATE KERNEL MATRIX TO TRAIN A KERNEL MACHINE

TECHNICAL FIELD

Embodiments of the invention relate to the field of machine learning. More particularly, at least one embodiment of the invention relates to a method for improving the performance of a kernel machine (KM) by approximating a kernel matrix (K).

BACKGROUND

Conventionally, machine learning techniques have required massive amounts of processing power and storage space. One conventional type of machine learning involves a kernel machine. Kernel machines have been employed in applications including, for example, audio/video processing, power management, circuit layout, scheduling, and so on. Kernel machines may employ a kernel matrix (K). The kernel matrix K may be constructed by applying a kernel function to pairs of points in a training data set. If there are N data points, then the kernel matrix K is an N×N matrix. This matrix grows quadratically with the size of the data set. This means that as N grows, performing conceptually simple tasks becomes practically impossible due to storage and/or processing power constraints.

Conventional kernel machines may sparsify K. However conventional kernel machines still require that K be computed in its entirety before the sparsification is performed. While a sparsifying kernel machine (SKM) may be more efficient than a KM that does not sparsify, even an SKM will become unwieldy for larger data sets since the quadratically growing K will still require impractical amounts of processing time and/or memory.

BRIEF DESCRIPTION OF THE DRAWINGS

The accompanying drawings, which are incorporated in and constitute a part of the specification, illustrate example system and method embodiments including various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

DETAILED DESCRIPTION

Figure 1:
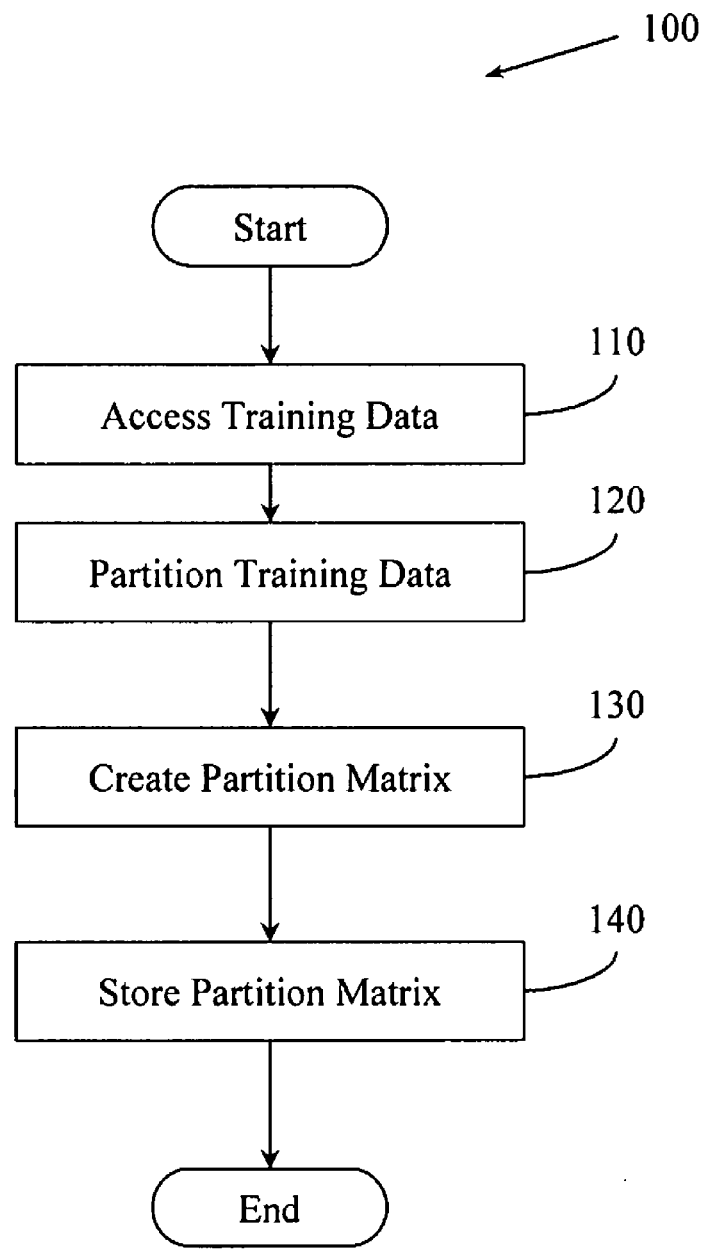
FIG. 1 illustrates a method for estimating a kernel matrix in accordance with at least some aspects of the invention.

Kernel machines need to be trained. The purpose of training a kernel machine (KM) is to discover a function to predict the value of a vector y for an as-yet-unseen value of a vector x. Training a KM includes processing a training data set that provides examples of input vectors x and output vectors y. Training has conventionally involved repeatedly computing a matrix-vector product between a kernel matrix (K) and an iterate vector (u). The matrix-vector product is typically updated on each training iteration. When the training data set has N D-dimensional samples, then K is an N×N matrix and u is an N×1 vector. Conventionally, K was computed in $O(DN^2)$ time, required $O(N^2)$ storage, and the multiplication to produce the matrix-vector product took $O(N^2)$ time.

Kernel machines typically employ a semi-definite K that is constructed by applying a kernel function k(x,x') on pairs of points. If there are N data points, K is an N×N positive semi-definite matrix whose $ij^{th}$ element is $k(x_i, x_j)$. KM processing typically included repeated multiplication between K and u. When the data set is D-dimensional, the cost of matrix-vector multiplication is $O(N^2D)$. Conventionally, the $ij_{th}$ element of K was obtained by applying a radial basis kernel function to (RBF) a pair of data points $x_i$ and $x_j$. An RBF may decompose according to:

$$k(x, y) = \prod_{d=1}^{D} k_d(|x^d - y^d|)$$

where $x^d$ denotes the $d^{th}$ component of vector x.

Kernel matrices built on RBFs depend on the distance between pairs of points, with $k(x_i, x_j) = k(\|x_i - x_j\|)$. Example systems and methods do not operate directly on a kernel matrix built using an RBF. Instead, example systems and methods threshold the distance between pairs of points so that pair-wise distances within a partition are set to some $\delta_0$ and pair-wise distances between points that straddle partitions are set to $\delta_1$. The thresholded distances define a thresholded kernel matrix approximation H, which is then used instead of kernel matrix K to, for example, compute the matrix vector product. Since H defines a partition of data, rather than explicitly storing data as an N×N matrix, H can store a list of points contained in each partition. H can therefore be multiplied by iterate vector u in O(N) time while still providing a good approximation to Ku.

Example systems and methods are built on the premise that K has a constrained structure. Due to this constrained structure, example systems and methods may reduce computation time and storage space for kernel machines by approximating K with H rather than explicitly computing K.

Instead of computing K directly, example systems and methods may repeatedly approximate K with randomly thresholded elements of K. In one example, an approximation of a matrix vector Ku can be generated by repeatedly thresholding K using different thresholding parameters, computing the matrix-vector product between u and the thresholded matrix, and averaging the results. The thresholding process can randomly partition data into non-overlapping partitions so that the probability that two points are assigned to the same partition is proportional to the corresponding entry in K. The data is binned using randomly shifted axis-aligned grids having random resolutions. Different iterations of the thresholding can use different parameters to lead to different binning. Multiple instances of H can be made with the different binning and then the results can be averaged to get a better approximation of K.

In one example, a partition may maintain an index of a set of points that it contains. For a partition, the elements of u corresponding to the indices of the partition can be summed and assigned to the indices of v. Observe that H may be viewed as a symmetric N×N matrix that has exactly as many unique rows as there are partitions. The product of each unique row and u can be computed using N additions because non-zero elements of the unique rows do not overlap. These values can be assigned to the elements of v with N assignments. Thus computing v=Hu can be done in O(N) operations.

H corresponds to the partition and is a thresholding of K because large entries of K are more likely to be set to 1 in H than smaller entries of K. The thresholding performed by example systems and methods produces at least three results.

A first result is that K is approximated by H in order O(N), which does not require computing K or touching pairs of points. This result is obtained since example systems and methods bin dimensions of the data independently of other dimensions using a grid with a randomly chosen species shifted, for example, randomly left or right. Points are hashed using bin numbers into which they are gridded along dimensions. Points that hash to the same location are grouped together in a final partitioning.

A second result is that H provides a superior approximation to K over conventional approaches. If grid sizes are randomly drawn from a distribution $g(e)=e\,k_d''(e)$, then the expectation of H is proportional to K. It can be shown that at most $O(\text{epsilon}^{-2} \log N)$ instances of H need to be averaged so that the deviation from the true expectation (K) does not exceed some epsilon with probability $1-\exp(-\text{epsilon}^2)$.

A third result is that the matrix-vector products can be processed in O(N) time without explicitly constructing H. For example, to compute v=Hu, example systems and methods may compute the sum of the entries u that correspond to the elements of a partition in O(N) time. The sum for a partition may then be assigned to an entry in v corresponding to the partition elements.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment, though it may.

The following includes definitions of selected terms employed herein. The definitions include various examples and/or forms of components that fall within the scope of a term and that may be used for implementation. The examples are not intended to be limiting.

"Logic", as used herein, includes but is not limited to hardware, firmware, software and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, objects, functions (local and/or remote), servelets, applets, instructions stored in a memory, part of an operating system, and so on.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. It is to be appreciated that throughout the description, terms including processing, computing, calculating, determining, displaying, automatically performing an action, and so on, refer to actions and processes of a computer system, logic, processor, or similar electronic device that manipulates and transforms data represented as these physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an example method. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

FIG. 1 illustrates a method 100 for producing a partition matrix H that approximates a kernel matrix K for a kernel machine (KM). Method 100 may include, at 110, accessing a set of kernel machine training data (KMTD). The set of KMTD may include, for example, a set of input vectors x and a set of output vectors y. An input vector $x_i$ may correspond to an output vector $y_j$ and thus relationships between vectors and/or training points may be used in approximating a K with H.

Method 100 may also include, at 120, partitioning the KMTD into a set of partitioned training data. The partitioning may be based, at least in part, on a set of partition parameters. The set of partition parameters may include, for example, an axis-aligned grid location, and an axis-aligned grid resolution. These parameters may control the location(s) of a grid used to bin the input data. In method 200 (FIG. 2), one or more of these parameters may be manipulated in different iterations of method 200 to produce different partitions and thus different partition matrices. In one example, the set of partitioned training data is to be partitioned to have no overlapping partitions.

Method 100 may also include, at 130, creating H from the set of partitioned training data. H is to approximate K. In one example, H is to be created in O(N) time and is to have an expectation proportional to the expectation of a K that would be created in O($N^2$) time by applying an RBF technique to the set of KMTD, N being the number of elements in the KMTD. In one example, creating H may include binning the set of partitioned training data based on the distance between pairs of its members. For example, pair-wise distances between points within a partition may be set to a first value $\delta_0$ (e.g., 1) and pair-wise distances between points that straddle a partition may be set to a second value $\delta_1$ (e.g., 0). In one example, creating H may include storing in H a list of points from the set of KMTD. The creating may also include storing in H as many unique rows as there are partitions in the set of partitioned training data. With the unique rows stored, the creating may also include storing non-zero elements of the unique rows in H so that the non-zero elements do not overlap.

Method 100 may also include, at 140, storing H in a computer memory. While storing H is described, it is to be appreciated that the non-transitory physical transformation of the electrical and/or magnetic symbols inside a computer in which method 100 is performed may also facilitate displaying H.

Figure 2:
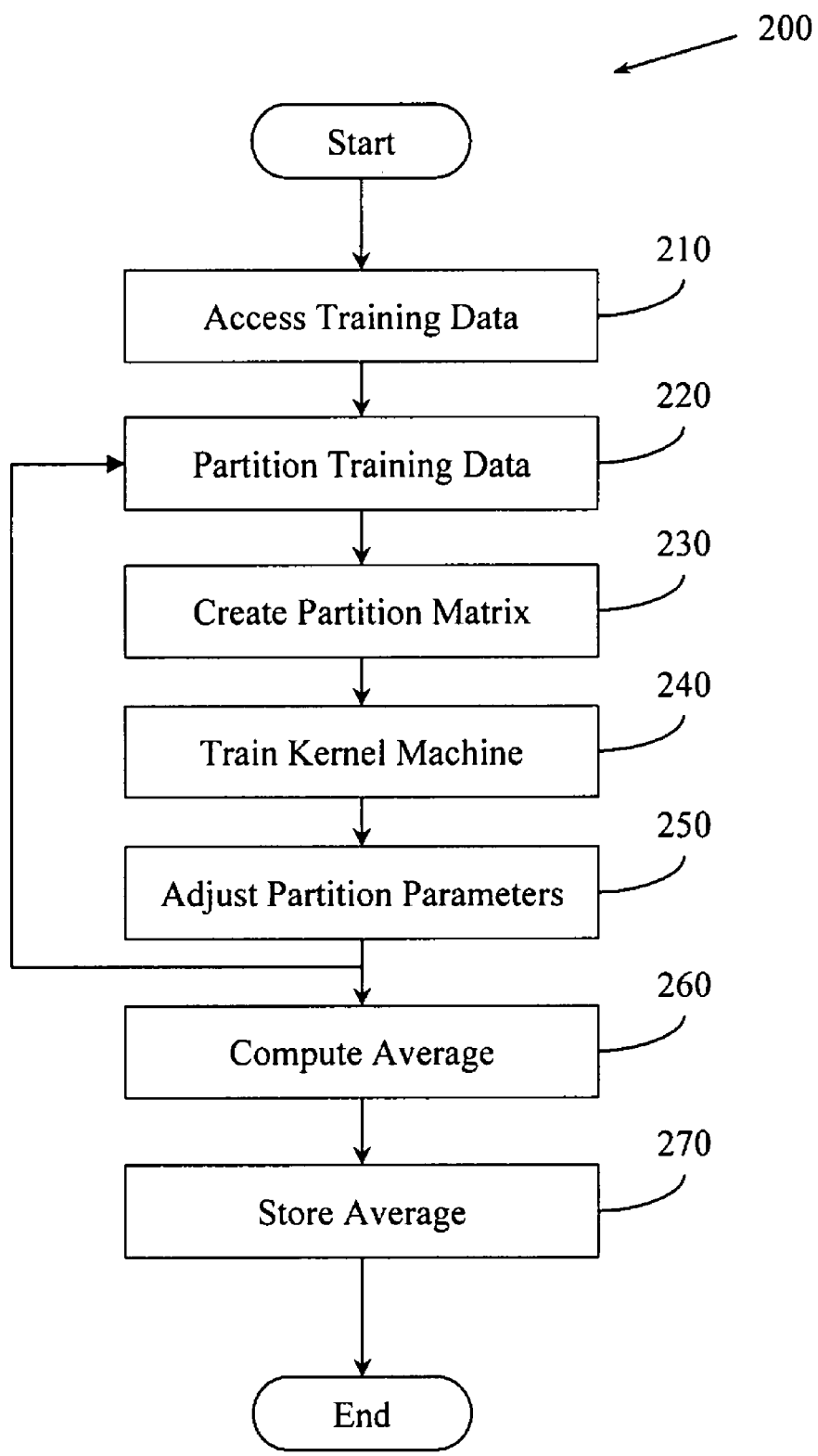
FIG. 2 illustrates a method for estimating a kernel matrix in accordance with at least some aspects of the invention

FIG. 2 illustrates a method 200 for generating an approximation H of a kernel matrix K. Method 200 includes some actions similar to those described in connection with method 100 (FIG. 1). For example, method 200 includes accessing training data at 210, partitioning training data at 220, and creating a partition matrix at 230. However, method 200 may include other actions.

For example, method 200 may include, at 240, training up a KM using the partition matrix. In one example, training up the KM may include computing a matrix-vector product from the partition matrix and an iterate vector in O(N) time, N being an integer representing the number of entries in the partition matrix. In one example, computing the matrix-vector product may include summing elements of the iterate vector corresponding to the indices of a partition into a set of summed elements and assigning members of the set of summed elements to corresponding indices of the matrix-vector product.

As described above, method 200 may include performing several iterations of partitioning and approximating. Thus, method 200 may include, at 250, adjusting one or more of the partition parameters. For example, a grid may be shifted left or right, a grid may be resized, and so on. The gridding will affect the partitioning. Method 200 may cycle through several iterations that produce several approximations. In one example, method 200 may include, at 260, creating an average partition matrix $H_{avg}$ based on two or more of the partition matrices created in the multiple iterations. Method 200 may conclude, at 270, by storing the average approximation $H_{avg}$ in a memory.

Figure 3:
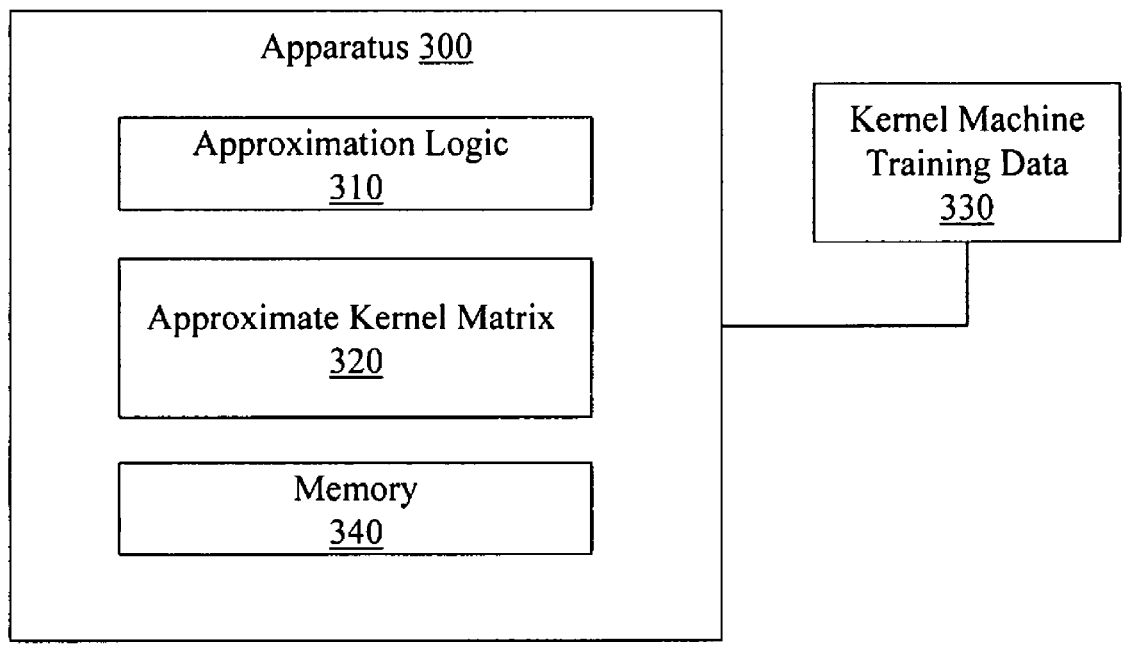
FIG. 3 illustrates an apparatus for estimating a kernel matrix in accordance with at least some aspects of at least one embodiment of the invention.

FIG. 3 illustrates an apparatus 300 to produce an estimate for a kernel matrix K associated with a kernel machine. Apparatus 300 may include an approximation logic 310 to produce an approximate kernel matrix 320 in O(N) time from a set of kernel machine training data 330. The approximation logic 310 may create the approximate kernel matrix 320 by, for example, binning members of the set of kernel machine training data 330 based on the distance between pairs of members. Based on the binning, approximation logic 310 may selectively store a list of points from the training data 330 in the approximate kernel matrix 320. Having stored the list of points, approximation logic 310 may then store in the approximate kernel matrix 320 a set of unique rows and then store non-zero elements of the unique rows in the approximate kernel matrix 320 so that the non-zero elements do not overlap. Apparatus 300 may also include a memory 340 in which the approximate kernel matrix 320 can be stored.

Figure 4:
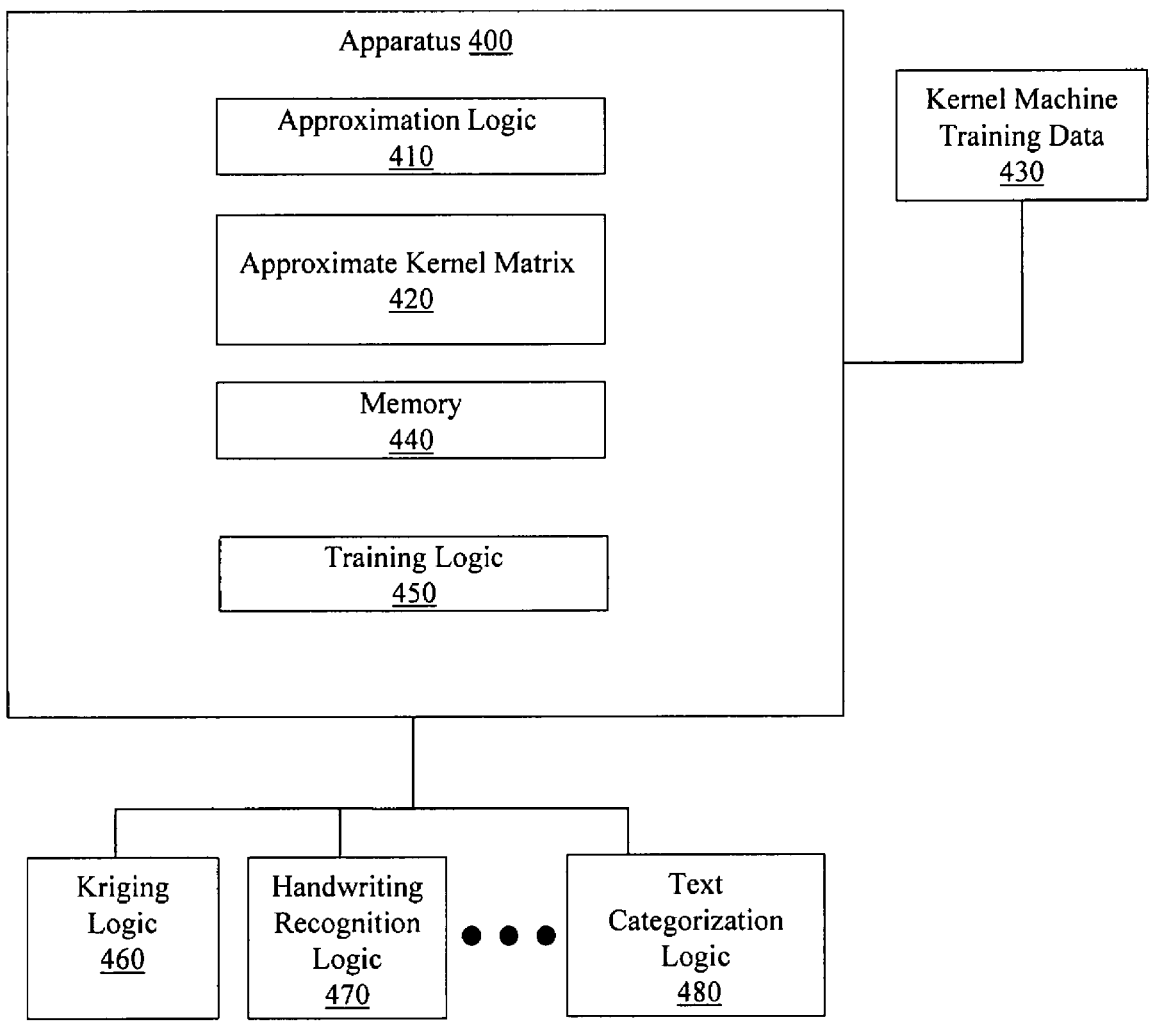
FIG. 4 illustrates an apparatus for estimating a kernel matrix in accordance with at least some aspects of at least one embodiment of the invention.

FIG. 4 illustrates an apparatus 400 to produce an estimate for a kernel matrix K associated with a KM. Apparatus 400 may include some elements similar to those described in connection with apparatus 300 (FIG. 3). For example, apparatus 400 may include an approximation logic 410 to create an approximate kernel matrix 420 from a set of training data 430. Apparatus 400 may also include a memory 440. Approximate kernel matrix 420 may be stored in memory 440.

However, apparatus 400 may include additional elements. For example, method 400 may also include a training logic 450 to train up a KM using the approximate kernel matrix 420. Since apparatus 400 may train up a KM, apparatus 400 may also include and/or interact with a set of logics that rely on a trained up KM. For example, apparatus 400 may include and/or interact with a kriging logic 460, a handwriting recognition logic 470, and a text categorization logic 480. While three logics are illustrated, it is to be appreciated that a greater and/or lesser number of logics performing different functions may be employed.

What is claimed is:

1. A method comprising:
   accessing a set of kernel machine training data;
   partitioning the kernel machine training data into a set of partitioned training data based, at least in part, on a set of partition parameters, the set of partition parameters comprising one or more of, an axis-aligned grid location, or an axis-aligned grid resolution;
   creating from the set of partitioned training data a partition matrix that approximates a kernel machine kernel matrix; and
   storing the partition matrix in a computer memory.

2. The method of claim 1, wherein the set of partitioned training data has no overlapping partitions.

3. The method of claim 2, wherein creating the partition matrix comprises binning the set of partitioned training data based on the distance between pairs of members of the set of partitioned training data, wherein pair-wise distances between points within a partition of the set of partitioned training data are set to $\delta_0$ and pair-wise distances between points that straddle a partition of the set of partitioned training data are set to $\delta_1$, wherein $\delta_0$ does not equal $\delta_1$.

4. The method of claim 3, wherein $\delta_0$ is equal to 1 and $\delta_1$ is equal to 0.

5. The method of claim 3, wherein creating the partition matrix comprises:
   storing in the partition matrix a list of points from the set of kernel machine training data;
   storing in the partition matrix as many unique rows as there are partitions in the set of partitioned training data; and
   storing non-zero elements of the unique rows in the partition matrix so that the non-zero elements do not overlap.

6. The method of claim 5, further comprising:
   training a kernel machine (KM) using the partition matrix.

7. The method of claim 5, wherein creating the partition matrix is to occur in O(N) time and wherein the partition matrix is to have an expectation proportional to the expectation of a kernel matrix that would be created in $O(N^2)$ time by applying a radial basis function technique to the set of kernel machine training data, N being the number of elements in the partition matrix.

8. The method of claim 6, wherein training the KM comprises:
computing a matrix-vector product from the partition matrix and an iterate vector in $O(N)$ time, N being an integer representing the number of entries in the partition matrix.

9. The method of claim 8, wherein computing the matrix-vector product comprises:
summing elements of the iterate vector corresponding to the indices of a partition into a set of summed elements and
assigning members of the set of summed elements to corresponding indices of the matrix-vector product.

10. The method of claim 1, further comprising:
performing a plurality of iterations of the method, where one iteration of the plurality of iterations is to be performed with a different set of partition parameters than another iteration of the plurality of iterations;
creating an average partition matrix based on a plurality of partition matrices created by performing the plurality of iterations; and
storing the average partition matrix.

11. The method of claim 1, wherein the set of kernel machine training data comprises a set of input vectors x and a set of output vectors y, and wherein an input vector $x_i$ corresponds to an output vector $y_i$.

12. An apparatus comprising:
an approximation logic to produce an approximate kernel matrix (AKM) in $O(N)$ time from a set of kernel machine training data (KMTD) having N pairs of points, where the AKM is to have an expectation proportional to the expectation of a kernel matrix (K) that is to be created in $O(N^2)$ time by applying a radial basis function technique to the set of KMTD, and wherein the approximation logic is to produce the AKM by:
binning the set of KMTD based on the distance between pairs of members of the set of KMTD;
selectively storing in the AKM a list of points from the set of KMTD based, at least in part, on the binning;
storing in the AKM a set of unique rows, where the number of members of the set of unique rows equals the number of bins used by the binning; and
storing in the AKM non-zero elements of the unique rows in the AKM so that the non-zero elements do not overlap;
a training logic to train a kernel machine using the approximate kernel matrix; and
a memory to store the AKM.

13. The apparatus of claim 12, further comprising:
one or more of, a geostatistics analysis logic, a kriging logic, an inverse distance weighting logic, a text categorization logic, or a handwriting recognition logic, wherein the trained kernel machine is to support one or more of the geostatistics analysis logic, the kriging logic, the inverse distance weighting logic, the text categorization logic, or the handwriting recognition logic.

* * * * *